United States Patent [19]

Lutz

[11] Patent Number: 4,626,023
[45] Date of Patent: Dec. 2, 1986

[54] SLIDING ROOF HAVING A SLIDING INSIDE ROOF LINING

[75] Inventor: Alfons Lutz, Emmering, Fed. Rep. of Germany

[73] Assignee: Webasto-Werk W. Baier GmbH & Co., Fed. Rep. of Germany

[21] Appl. No.: 622,723

[22] Filed: Jun. 20, 1984

[30] Foreign Application Priority Data

Jun. 29, 1983 [DE] Fed. Rep. of Germany ....... 3323396

[51] Int. Cl.[4] ............................ B60J 7/04; B32B 3/12; B32B 7/10
[52] U.S. Cl. .................................... 296/216; 296/211; 296/222; 428/117; 428/200
[58] Field of Search ........ 296/211, 214, 215, 216–218, 296/221–223; 428/117, 104, 194, 200

[56] References Cited

U.S. PATENT DOCUMENTS

| | | | |
|---|---|---|---|
| 3,249,659 | 5/1966 | Voelker | 428/117 |
| 3,256,527 | 6/1966 | Studen | 156/250 |
| 3,529,394 | 9/1970 | Wilkins | 428/117 |
| 3,863,758 | 2/1975 | Connelly | 428/194 |
| 3,906,128 | 9/1975 | Burling et al. | 428/200 |
| 3,964,784 | 6/1976 | Precter et al. | 296/215 |
| 4,129,672 | 12/1978 | Momura et al. | 296/211 |
| 4,162,341 | 7/1979 | Norton | 428/117 |
| 4,263,356 | 4/1981 | Nomura et al. | 296/214 |
| 4,312,533 | 1/1982 | Jardin et al. | 296/215 |
| 4,478,660 | 10/1984 | Landler et al. | 296/211 |
| 4,513,548 | 4/1985 | Parker | 296/211 |
| 4,533,577 | 8/1985 | Mier | 428/194 |

FOREIGN PATENT DOCUMENTS 2491841 4/1982 France ..................... 296/215

Primary Examiner—Robert B. Reeves
Assistant Examiner—Dennis H. Pedder
Attorney, Agent, or Firm—Sixbey, Friedman & Leedom

[57] ABSTRACT

A sliding roof for motor vehicles having a transparent rigid sliding cover by means of which an opening in the roof can be selectively closed or can be exposed at least partially. A frameless sliding inside cover lining is provided that can be displaced at least in the cover sliding direction independently from the sliding cover and is guided at its lateral edges. The sliding inside cover lining is formed of a sandwich panel having a core layer and a cover layer that is applied to said core layer at least on one side. In the area of its lateral edges, the sandwich panel is squeezed together reducing the core thickness and increasing its density to form sliding guide edges.

30 Claims, 8 Drawing Figures

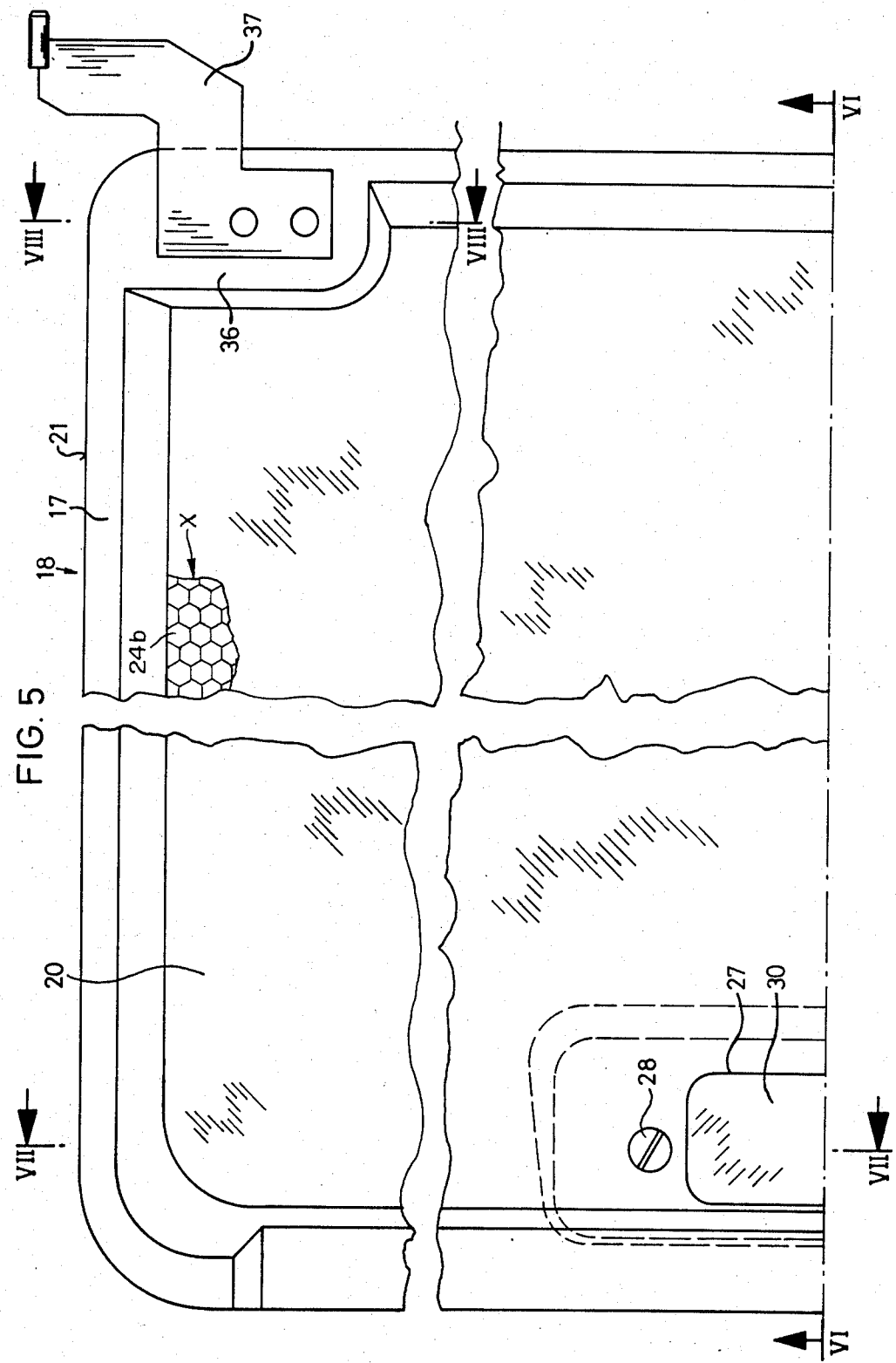

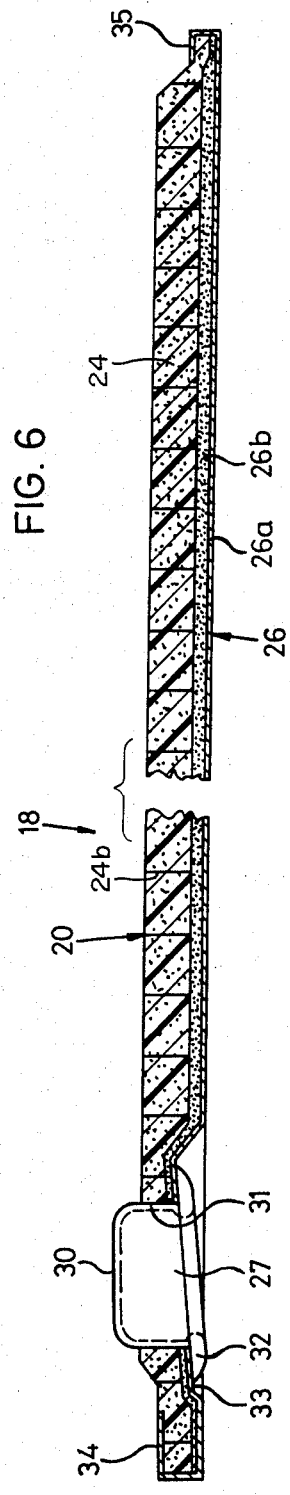
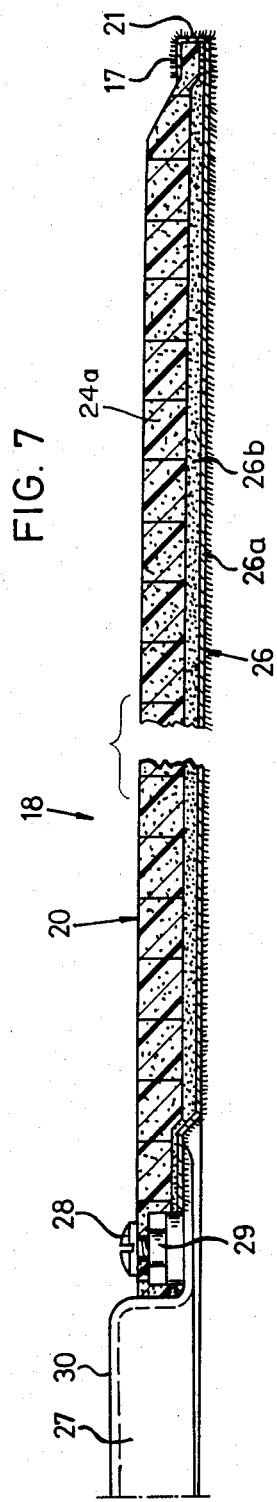

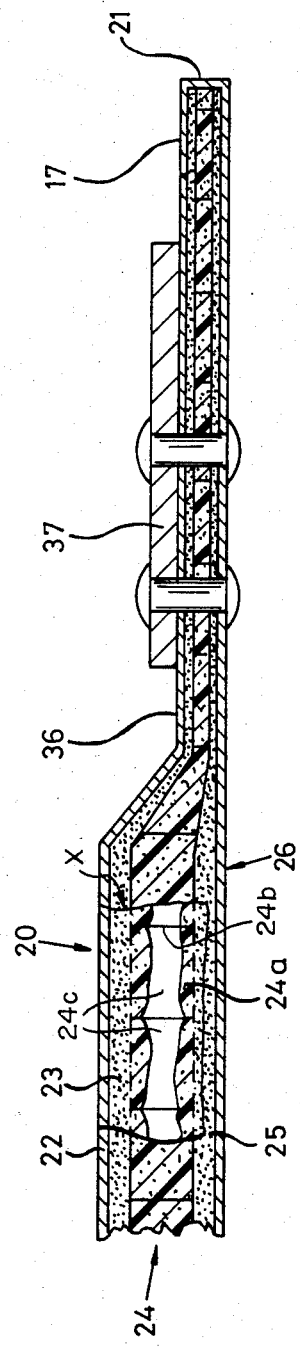

SLIDING ROOF HAVING A SLIDING INSIDE ROOF LINING

BACKGROUND AND SUMMARY OF THE INVENTION

This invention relates to a sliding roof for motor vehicles having a transparent rigid sliding cover, by means of which an opening in the roof can be selectively closed or can be at least partially exposed, as well as having a frameless inside cover lining that can be adjusted, at least in the closing direction, independently from the sliding cover and is guided at its lateral edges.

Sliding roofs of this type are known (U.S. Pat. No. 4,018,476 and U.S. Pat. No. 4,320,921), where the sliding inside cover lining consists of a molded plastic part. Especially in cases when the motor vehicle is parked in the sun while the sliding cover is closed, relatively high temperatures sometimes occur on the inside of the motor vehicle. The influence of the heat can result in deformation of the large-area, sliding inside cover lining, which may result in the sliding inside cover lining becoming jammed in its guides. This cannot be remedied in a satisfactory manner, even if the sliding inside cover lining is lock-beaded or provided with welded-on grid profiles.

The invention, therefore, has a principle object of creating a sliding roof of the initially-mentioned type where the sliding inside cover lining is formed in such a way that it requires low manufacturing expenditures, but is especially insensitive with respect to thermal and other stresses.

According to a preferred embodiment of the invention, this object is achieved by forming the sliding inside cover lining as a panel of sandwich-type construction having a core layer and a cover layer that is applied at least on one side of said core layer, and by squeezing the sandwich panel together in the area of its lateral edges in a manner forming guide edges.

It is known to use sandwich panels in motor vehicle construction. For example, DE-OS 28 45 708 describes a rigid motor vehicle roof having a sandwich panel, the exterior side of which forms the roof membrane, and the interior side of which forms the rigid inside roof lining. Flap-shaped front hoods made of sandwich panels are explained in DE-PS 29 34 430. A spoiler roof is known from DE-OS 31 10 698, where the sliding cover is developed as a sandwich component. However, so far, such sandwich panels have not been used for sliding inside cover linings of sliding roofs. Among other things, this is probably the result of the fact that sliding inside cover linings must be guided laterally and, for this guiding, only a very limited space is available in a vertical direction. Sandwich panels cannot be slid into the guides of the known types.

By means of the present invention, the inherent stability of the sandwich panels, while the weight is the same, is considerably increased as compared to molded plastic parts. Weighing the same and/or having the same overall height, such sandwich panels have a much higher stability and a considerably reduced tendency to expand and deform under the influence of heat. At the same time, the compression of the sandwich panel in the area of its lateral edges, according to the present invention, provides guide edges for the sliding inside cover lining, which fit into space-saving guides of the conventional type. The development of the guide edges by the squeezing of the sandwich panel is especially simple with respect to manufacturing. Suitable sandwich panels that can be compressed together are available commercially. At its bottom side and/or top side, the sandwich panel can be covered at random with few expenditures. The covering may take place during the manufacturing of the sandwich panel or later in the form of a separate working cycle. The sliding inside cover lining developed according to the invention, at the same time, results in improved muffling of noises.

In a further development of the invention, at least one of the layers of the sandwich panel has a pressure-reactive and/or thermoreactive plastic material which, when the sandwich panel is squeezed, develops a gluing activity. This ensures that, without additional manufacturing expenditures during the squeeze-shaping, stable and nondeformable guide ridges are obtained. The already relatively good muffling of noises by the sandwich panel sliding inside caover lining can be improved further by providing, especially the lower cover layer, with noise-reducing features. For example, the lower cover layer may expediently consist of flocks and/or foamed material and/or fabric, or can be flock-coated. A two-layer construction of the cover layer may also be provided, in which case, the lower layer consists of fabric and the upper layer consists of foamed material. Preferably, the lower cover layer, with respect to structure and/or shade of color, is matched in appearance to the rigid inside roof lining. The core layer may consist of rigid expanded plastics. Particularly high stabilities are obtained by means of a honeycombed core layer. In this case, the honeycombs may expediently consist of metal foil, such as aluminum foil or a plastic material, and may be at least partially hollow or filled, Suitable as fillers are especially rigid expanded plastics, synthetic resin or a composite material of synthetic resin and a fiberglass material.

Between the core layer and the respective cover layer, an intermediate layer may advantageously be provided which supplies the mutual connection between the core layer and the cover layer and/or provides a further stiffening of the sandwich panel. Preferably, the intermediate layer consists at least partially of a pressure-reactive and/or thermoreactive plastic material. In addition, the intermediate layer advantageously can supply at least part of the filler.

A gripping bowl may expediently be imbedded in the sandwich panel, in which case, the gripping bowl can be molded on or can be developed as a separately fastened part. The same is true for possible additional stops, catches or guide parts of the inside roof lining.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 5 shows a top view of the sliding inside roof lining of the sliding roof according to FIGS. 1 to 4;

FIG. 6 shows a section along Line 6—6 of FIG. 5;

FIG. 7 shows a section along Line 7—7 of FIG. 5; and

FIG. 8 shows a section along Line 8—8 of FIG. 5, however, of a modified construction comprising an upper cover layer, the intermediate layer, the core layer and the lower intermediate and core layer.

DETAILED DESCRIPTION OF THE PREFERRED EMBODIMENTS

Figure 1:
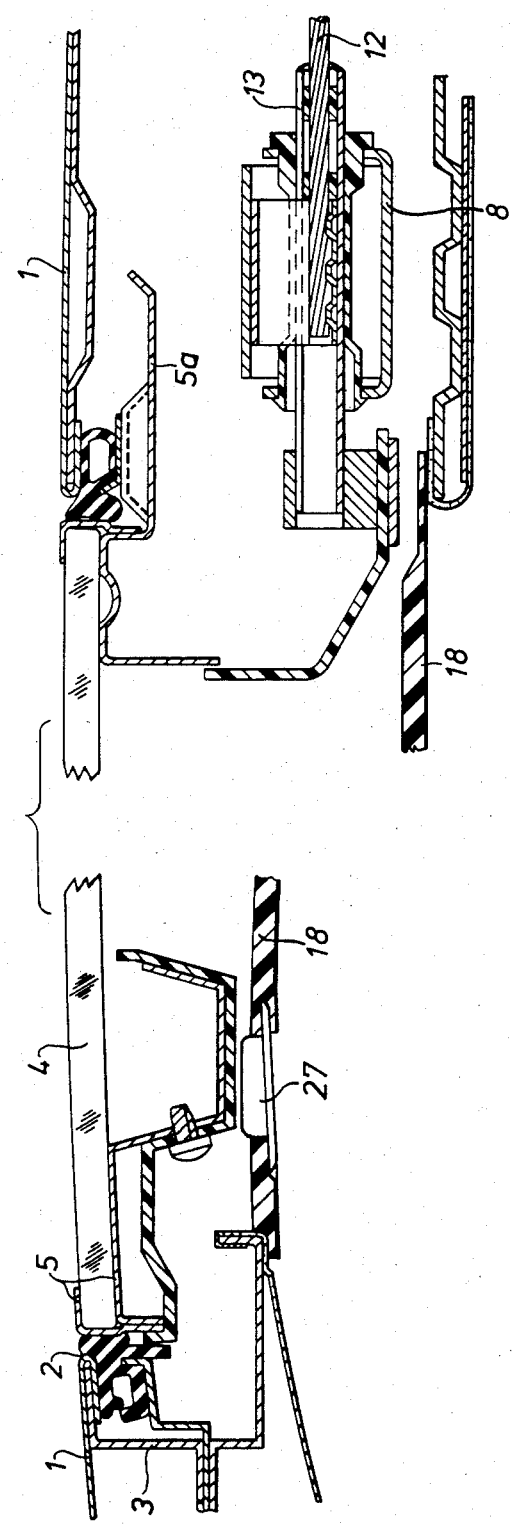
FIG. 1 shows a vertical longitudinal section through a sliding roof of a motor vehicle according to the invention.

With reference to FIG. 1, a stationary roof part 1 forms an essentially rectangular roof opening 2 which is surrounded by a roof frame 3. A rigid roof cover 4, made of a transparent or translucent material, is provided in order to selectively close the opening 2 in the roof (FIG. 1) or expose it at least partially. The edge of the sliding cover 4 is surrounded by a cover frame 5.

Figure 2:
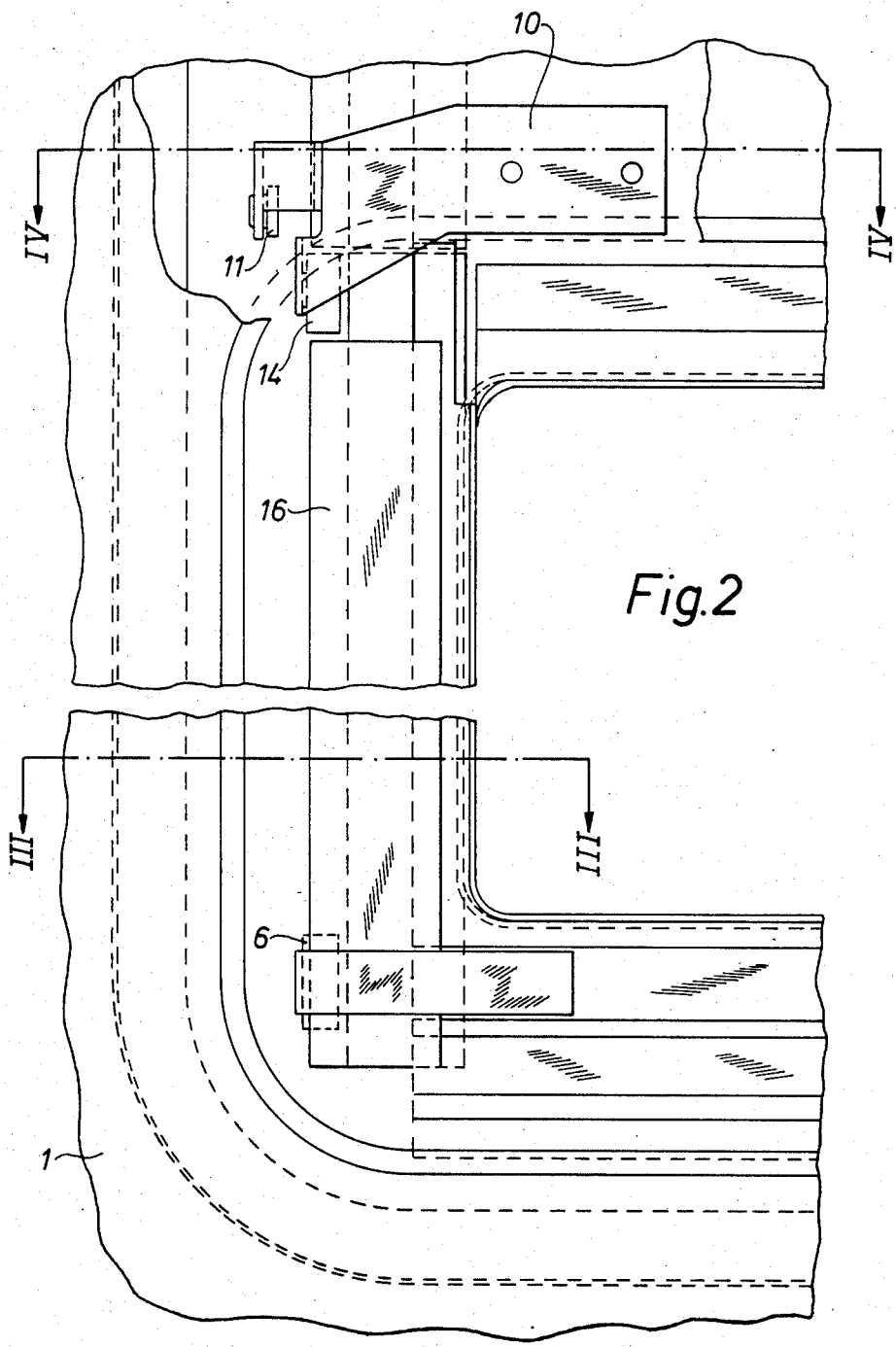
FIG. 2 shows a top view of the right side of the sliding roof according to FIG. 1, where the sliding cover is not shown and parts of the stationary roof structure are shown in a cut-open manner.
Figure 3:
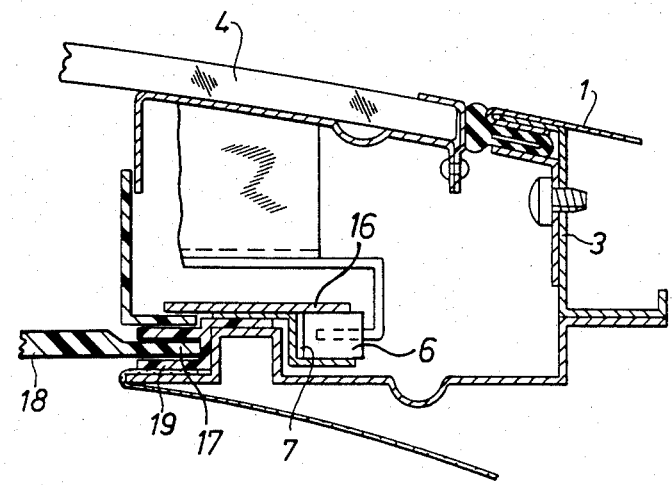
FIG. 3 shows a cross section along Line 3—3 of FIG. 2.
Figure 4:
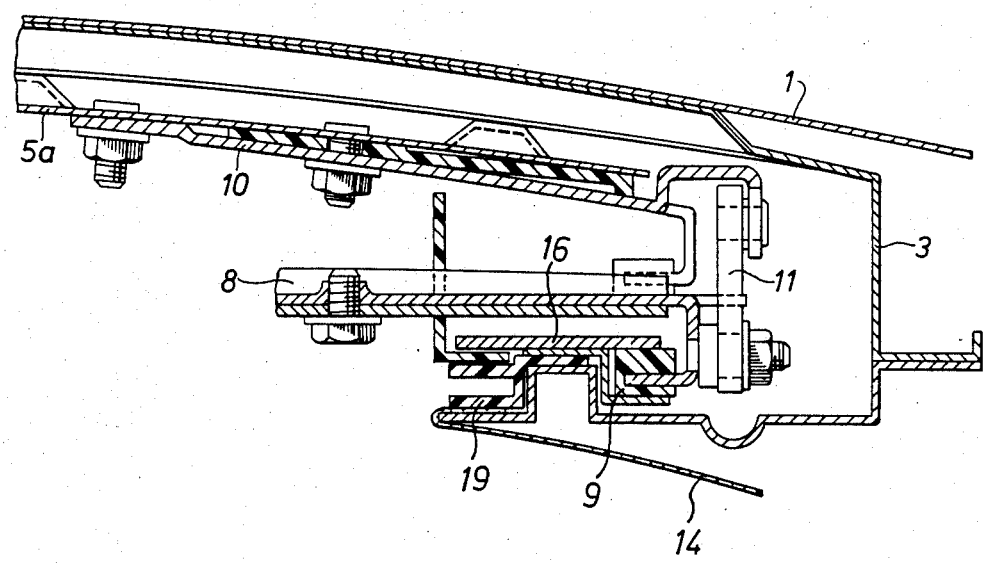
FIG. 4 shows a cross section along Line 4—4 of FIG. 2.

As shown in FIGS. 2 and 3, the sliding cover 4, in the area of its front part, has, on each side, a guide shoe 6 running in a cover guide track 7 that is fastened to the roof frame 3 and extends longitudinally. The rear part of the sliding cover 4 is connected with a transversely extending transport bridge 8 (FIG. 1). A part of the cover frame 5 forms a drip moulding 5a pointing toward the rear. Two brackets 10 are connected to extend downward from the drip moulding 5a. Tilt-out levers 11 are coupled to the brackets 10 and the transport bridge 8 (FIG. 4). The transport bridge 8 can be slid in longitudinal direction. It is guided by means of bridge guide shoes 9 which interact with the cover guide 7.

The longitudinal adjustment of the transport bridge 8 expediently takes place via a cable 12 (FIG. 1) that is guided in a guide tube 13, that is slotted in the longitudinal direction. The rear end of said guide tube 13 (not shown) is connected with the stationary roof part 1. For the opening of the sliding cover 4, the transport bridge 8 is moved toward the rear by means of the cable 12, in which case, the tilt-out levers 11 first cause a lowering of the rear part of the cover 4 from the opening in the roof, whereupon the cover, together with the transport bridge 8, slides toward the rear under the rear part of the stationary roof 1. The guide channel in which the guide shoes 6 and 9 run, toward the top, is delimited by a covering 16. A guiding means 19 for an inside roof lining 18 is arranged between the covering 16 and roof frame 3. The arrangement explained so far is known (U.S. Pat. No. 4,018,476).

In the guiding means 19 for the inside roof lining, run guide edges 17 of the sliding inside roof lining 18, consisting essentially of a sandwich panel 20. The guide edges 17 are obtained by the fact that the sandwich panel 20, in the area of its lateral edges 21 (of which only one is shown in FIGS. 5 and 7) is squeezed together.

As shown, especially in FIGS. 6 and 7, the sandwich panel 20 has a core layer 24 and a lower cover layer 26. The cover layer 26 is developed in two plies. The lower ply 26a consists of a fabric; the upper ply 26b consists of a noise-muffling foamed material. The core layer 24 can, advantageously, be a honeycomb structure 24b made of a plastic material, saturated paper or metal foil, especially aluminum foil. The honeycombs of the core layer 24 are filled, at least partially, with a rigid expanded foam filling 24a. The plies 26a, 26b may, expediently, be glued to one another and to the core layer 24, and optimally, as indicated in FIG. 7 lower cover layer 26 may be flocked.

According to the modified embodiment according to FIG. 8, the sandwich panel 20 consists of an upper intermediate layer 23, the honeycomb-shaped core layer 24, a lower intermediate layer 25 and the lower cover layer 26, which, in this case, consists only of one ply. The cover layers 22, 26 may be decorative layers and/or padding layers, which may consist of materials such as a textile fabric, a foamed material, a fibrous web or a foil. Expediently, the lower cover layer 26 in its structure and color is matched with the stationary roof lining shown at 14 (FIG. 4). The intermediate layers 23 and 25 may be formed of fiberglass reinforced foamed carrier layers having a pressure-reactive or thermoreactive plastic matrix which develops a gluing action, when the sandwich panel is compressed, serving to bond the intermediate layers to their adjacent layers, for example, of a material such as STRUCTHAN, sold by KTL Kunstoff-Technik GmbH & Co., Lemförde, Federal Republic of Germany. Thus, intermediate layers 23, 25, the core layer 24 and the cover layers 22, 26, and layer 26a of FIGS. 6, 7 may be constructed and function similarly.

When the sandwich panel 20 is squeezed together to form the guide edges 17, the plastic matrices of the intermediate layers 23, 25 and/or the filling 24a of the core layer 24 and/or the gluing of the plies 26a, 26b to one another or to the layer 24 provide more or less massive guide edges 17 of a relatively reduced thickness and increased density.

As shown in FIGS. 5 and 7, the central front area of the sliding inside roof lining 18 has a sunken-in grip bowl 27 which is fixed by means of screws 28, which are screwed into molded-on eyes 29 of the gripping bowl. By means of a part 30, the gripping bowl 27 reaches through a cutout 31 of the sliding inside roof lining 18, and rests against shoulders 33 of lining 18 by means of a surrounding flange 32, which projects outwardly from bowl 27. The shoulders 33 extend around the cutout 31, and are formed by a pressing-in of the sandwich panel 20 in this area. Alternatively, gripping bowl 27 can be retained by having been molded into the panel 18 as schematically depicted in FIG. 1.

In addition, the sandwich panel 20 is squeezed together also along its front and its rear edge 34 and 35 in order to form stop ridges. At both sides of the rear edge, squeezed-together stop mounting surfaces 36 are provided, of which only one is shown in FIG. 5. Stop and guide parts 37 are riveted in the area of these stop mounting surfaces 36.

As shown especially in FIGS. 6 and 7, the bottom side of the sliding inside roof lining 18 is flat. That means that the sandwich panel 20, with the exception of the area of the gripping bowl, is pressed together from above.

With reference to detail "X", FIGS. 5 and 8, it is noted that the honeycombs 24b need not be completely filled with material 24a, but may be only partially so filled, particularly so as to form hollow interspaces 24c. In this regard, such partial filling may be accomplished with material supplied by the intermediate layers 23, 25 (such being represented by the broken line separation between layer 24 and layers 23, 25 in detail X of FIG. 8), when the sandwich panel is compressed, as noted above, for bonding of the intermediate layers to their adjacent layers.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A sliding roof for motor vehicles having a transparent rigid sliding cover by means of which an opening in the roof can be selectively closed or at least partially exposed, as well as having a frameless inside cover lining that is displaceable, at least in the sliding direction of the sliding cover, independently from the sliding cover, said cover lining having lateral guide edges guided in guide means, wherein the inside cover lining is formed as a multi-layer panel having at least a core layer of a first thickness and density and a cover layer, said core and cover layer having essentially equal transverse dimensions, said cover layer being applied at least on one side of said core layer, and the core and cover layers, in an area of their lateral edges, being compressed together in a manner reducing said thickness and increasing said density of at least said core layer relative to the first thickness and density thereof and forming said guide edges as a result.

2. A sliding roof according to claim 1, wherein at least one of the layers of the multi-layer panel has at least one of a pressure-reactive and a thermoreactive plastic material which, when the panel layers are compressed, develops a gluing action.

3. A sliding roof according to claim 1, wherein the cover layer is on a lower side of the core layer of the multi-layer panel and is formed of a noise-muffling construction.

4. A sliding roof according to claim 3, wherein the lower cover layer is flocked.

5. A sliding roof according to claim 1, wherein the cover layer is formed, at least partially, of a foamed material.

6. A sliding roof according to claim 3, wherein the cover layer is formed, at least partially, of a foamed material.

7. A sliding roof according to claim 1, wherein the lower cover layer is formed, at least partially, of a fabric.

8. A sliding roof according to claim 1, wherein a lower cover layer is formed of two plies, the lower ply comprising a fabric and the upper ply comprising a foamed material.

9. A sliding roof according to claim 2, wherein a lower cover layer is formed of two plies, the lower ply comprising a fabric and the upper ply comprising a foamed material.

10. A sliding roof according to claim 8, wherein a lower cover layer is matched in appearance with a statonary inside roof lining of the motor vehicle.

11. A sliding roof according to claim 1, wherein the core layer comprises a rigid expanded foam.

12. A sliding roof according to claim 1, wherein the core layer is honeycombed.

13. A sliding roof according to claim 12, wherein the honeycombs of the core layer consist of a metal foil.

14. A sliding roof according to claim 13, wherein the metal foil is an aluminum foil.

15. A sliding roof according to claim 12, wherein the honeycombs of the core layer consist of plastic.

16. A sliding roof according to claim 12, wherein the honeycombs are at least partially hollow.

17. A sliding roof according to claim 12, wherein the honeycombs are at least partially filled with a filler.

18. A sliding roof according to claim 17, wherein a rigid expanded foam is provided as the filler.

19. A sliding roof according to claim 17, wherein a synthetic resin is provided as the filler.

20. A sliding roof according to claim 17, wherein a synthetic resin and fiberglass material is provided as the filler.

21. A sliding roof according to claim 1, wherein an intermediate layer is disposed between the core layer and the cover layer, said intermediate layer providing a mutual connection of the core layer and the cover layer.

22. A sliding roof according to claim 21, wherein the intermediate layer comprises at least one of a pressure-reactive and a thermoreactive plastic material which, when the sandwich panel is compressed, develops a gluing action bonding the intermediate layer to the core and cover layers.

23. A sliding roof according to claim 21, wherein an intermediate layer and a cover layer are provided on both sides of the core layer.

24. A sliding roof according to claim 23, wherein the intermediate layer comprises at least one of a pressure-reactive and a thermoreactive plastic material which, when the layers of the panel are compressed, develops a gluing action bonding the intermediate layer to the core and cover layers.

25. A sliding roof according to claim 24, wherein said core layer comprises a honeycomb structure that is at least partially filled with a synthetic plastic material.

26. A sliding roof according to claim 1, wherein a gripping bowl is sunk into the multi-layer panel.

27. A sliding roof according to claim 26, wherein the gripping bowl is molded into the multi-layer panel.

28. A sliding roof according to claim 26, wherein the gripping bowl is inserted into the multi-layer panel as a separately manufactured component.

29. A sliding roof according to claim 21, wherein the intermediate layer is designed for further stiffening the multi-layer panel.

30. A sliding roof according to claim 12, wherein an intermediate layer is disposed between the honeycombed core layer, and the cover layer and the honeycombs are at least partially filled with material from the intermediate layer.

* * * * *